United States Patent Office 3,452,021
Patented June 24, 1969

3,452,021
10-(AMINOALKANOYL) ACRIDANES
Alex Meisels, Basel, and Angelo Storni, Allschwil, Basel-Land, Switzerland, assignors to Geigy Chemical Corporation, Greenburgh, N.Y., a corporation of Delaware
No Drawing. Filed Mar. 21, 1966, Ser. No. 535,684
Claims priority, application Switzerland, Mar. 24, 1965, 4,099/65, 4,100/65
Int. Cl. C07d 37/06, 31/42; A61k 27/00
U.S. Cl. 260—279                                    14 Claims

ABSTRACT OF THE DISCLOSURE

Substituted 10-(aminoalkanoyl)acridanes having antiviral and tumor-inhibiting properties and are prepared through amination of 10-haloalkanoylacridanes.

DETAILED DESCRIPTION

The present invention concerns new acridan derivatives and their acid addition salts as well as pharmaceutical compositions containing them and the use thereof for therapeutical purposes.

According to the first aspect of the invention, it has been found that hitherto unknown acridan derivatives falling under the formula

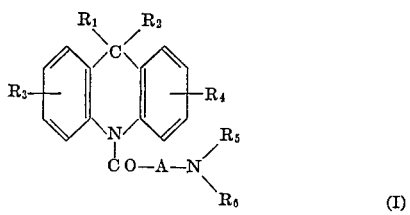

wherein:

$R_1$ and $R_2$ independently of each other represent hydrogen or lower alkyl radicals, or together represent a polymethylene bridge, so that these symbols $R_1$ and $R_2$ together with the carbon atom to which they are linked, represent in particular a five-membered, six-membered or seven membered saturated carbocyclic ring, each of $R_3$ and $R_4$, independently of the other, represents hydrogen, halogen atoms up to the atomic number 35, trifluoromethyl or a lower alkyl or lower alkoxy radical, $R_5$ represents a phenyl radical, a biphenylyl or phenoxyphenyl radical or a benzyl or diphenylalkyl radical, the benzene nuclei of all of which can contain at most three substituents from the group of halogen atoms, trifluoromethyl radicals, nitro groups, amino groups and lower alkyl, alkoxy, alkylamino, dialkylamino and alkanoylamino radicals, or it represents a pyridyl radical optionally substituted by halogen atoms, lower alkyl or alkoxy radicals, $R_6$ represents hydrogen or a lower alkyl radical, and A represents an alkylidene or alkylene radical having 1 to 5 carbon atoms, and their addition salts with inorganic and organic acids, have valuable pharmacological properties, in particular they have excellent antiviral and tumor-inhibiting activity combined with a favorable therapeutic index. The antiviral activity in animal tests can be proved, e.g. in mice against the Columbia-SK virus, the tumor-inhibiting activity in animal tests can be proved, e.g. on dimethyl-benzanthracene skin-tumors experimentally induced into mice. The pharmacological tests characterise the compound of Formula I and their acid addition salts as active ingredients for the treatment of virus diseases such as encephalitis, encephalomyelitis and others, as well as for the treatment of neoplasia.

Moreover, the compounds of Formula I and their acid addition salts show a mild analgesic activity.

Compounds falling under the formula

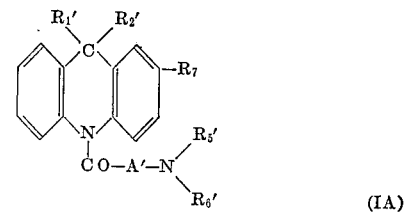

wherein:

$A'$ represents a methylene, ethylidene or ethylene radical,
$R_1'$ represents hydrogen or methyl,
$R_2'$ represents hydrogen, methyl or ethyl,
$R_5'$ represents phenyl, monochlorophenyl, dichlorophenyl, benzyl, monochlorobenzyl, dichlorobenzyl or bis-(chloro-phenyl)-ethyl,
$R_6'$ represents hydrogen or methyl, but preferably hydrogen, and
$R_7$ represents hydrogen or methyl, and their pharmaceutically acceptable acid addition salts are distinguished by good antiviral activity especially against Columbia SK virus, and are, therefore, indicated as agents for the treatment of encephalitis or encephalo-myelitis or similar viral infections.

Compounds falling under Formula I, in which A has the meaning of A' and preferably represents methylene, $R_1$ and $R_2$ each represent preferably methyl or the latter also ethyl, $R_5$ represents monochloro-phenyl, acetylamino-phenyl or pyridyl-(3) and $R_3$, $R_4$ and $R_6$ are all preferably hydrogen, as well as their pharmaceutically acceptable acid-addition salts, are distinguished by their activity against influenza virus, especially A–PR 8 virus, and are thus indicated as agents in the treatment of infections caused by influenza virus.

Compounds falling under Formula I, in which A, $R_1$, $R_2$, $R_3$, $R_4$ and $R_6$ have preferably the same meaning as in the case of the last-described subclass of anti-influenza-active compounds, but in which $R_5$ represents chloro-trifluoromethyl-phenyl, especially 4-chloro-3-trifluoromethyl-phenyl, are active against louping ill virus, and at the same time possess very significant analgesic activity. They are thus indicated as useful as combined analgeic/antiviral agent, e.g., against louping illness as it occurs in sheep. Compounds of this subclass in which $R_5$ represents chloro-dimethoxyphenyl, mono- or dichloro-phenyl are active against Herpes simplex virus.

Compounds falling under Formula I, in which A, $R_1$, $R_2$, $R_3$, $R_4$ and $R_6$ have preferably the same meaning as in the two foregoing subclasses, but in which $R_5$ represents benzyl, monochloro-benzyl, optionally methyl-substituted di-chlorobenzyl, preferably chlorinated bis-phenyl-ethyl, pyridyl or diphenyl possess especially significant tumor growth-inhibiting properties.

In the compounds of general Formula I and in the corresponding starting materials mentioned below, $R_1$ and $R_2$ independently of each other symbolise e.g. hydrogen, methyl, ethyl or n-propyl radicals, isopropyl, n-butyl or isobutyl radicals or, together they represent, e.g. the tetramethylene, pentamethylene or hexamethylene radical. $R_3$ and $R_4$ independently of each other are, e.g. hydrogen, fluorine, chlorine or bromine atoms, trifluoromethyl, methyl, ethyl, n-propyl, isopropyl, methoxy, ethoxy, n-propoxy or isopropoxy radicals. $R_5$ is, e.g. a phenyl-, o-fluorophenyl, m-fluorophenyl or p-fluorophenyl, o-chlorophenyl, m-chlorophenyl or p-chlorophenyl, o- or p- bromophenyl, o-iodophenyl, m-iodophenyl or p-iodophenyl, α,α,α-trifluoro-o-tolyl, α,α,α-trifluoro - m - tolyl, α,α,α-trifluoro-p-tolyl, o-, m- or p-tolyl, o-ethylphenyl, p-ethylphenyl, p-isopropylphenyl, o-methoxyphenyl, m-methoxyphenyl or p-methoxyphenyl, p-ethoxyphenyl, p-(n-propoxy)-phenyl, p-isopropoxyphenyl, o-, m- or p-nitrophenyl, o-, m- or p-aminophenyl, o-, m- or p-acetamidophenyl, o - dimethylaminophenyl, p - diethylaminophenyl, p-ethylaminophenyl, 2,4- or 2,5-difluorophenyl, 2,3-, 2,4-, 2,5-, 3,4-, 3,5- or 2,6-dichlorophenyl, 2,4-, 2,5- or 2,6-dibromophenyl, 2,3-, 2,4-, 2,5-, 2,6-, 3,4- or 3,5-xylyl, 2,4-diethylphenyl, 2,4-, 2,5-, 3,4- or 3,5-dimethoxyphenyl, 2,5-diethoxyphenyl, 2,4,5-trichlorophenyl, 2,4,5-trimethylphenyl, mesityl, 3,4,5-trimethoxyphenyl, 3-chloro-4-fluorophenyl, 4-fluoro-o-tolyl or 5-fluoro-o-tolyl, 4-fluoro-m-tolyl, 2- or 3-fluoro-p-tolyl, 4-chloro-o-tolyl, 5-chloro-o-tolyl, 6-chloro-o-tolyl, 2-chloro-p-tolyl, 2-bromo-p-tolyl, 4-iodo-o-tolyl, 3-iodo-p-tolyl, 4,α,α,α-tetrafluoro-o-tolyl, 4,α,α,α-tetrafluoro-m-tolyl, 6,α,α,α - tetrafluoro-m-tolyl, 4-chloro-α,α,α-trifluoro-o-tolyl, 4-chloro-α,α,α-trifluoro-m-tolyl, 6 - chloro-α,α,α-trifluoro-m-tolyl, 4-bromo-α,α,α-trifluoro-o-tolyl, 4-bromo-α,α,α-trifluoro-m-tolyl, 6-bromo-α,α,α-trifluoro - m - tolyl, 3-chloro-6-methoxy-phenyl, 4-methoxy-o-tolyl, 4-chloro - 2 - nitrophenyl, 4-chloro-3-nitrophenyl, 2-bromo-4-nitrophenyl, 4-nitro-o-tolyl, 5-nitro-o-tolyl and 6-nitro-o-tolyl, 2-nitro-p-tolyl and 3-nitro-p-tolyl, 4-nitro-α,α,α-trifluoro-m-tolyl, 2-nitro-α,α,α-trifluoro-p-tolyl, 2 - methoxy-5-nitrophenyl, 2-methoxy-6-nitrophenyl, 4 - methoxy - 2 - nitrophenyl, 2-amino - 4 - methoxyphenyl, 4,5-dichloro-o-tolyl, 2,4-dichloro-6-nitrophenyl, 2,5-dichloro - 4 - nitrophenyl, 4,5-dichloro - 2 - nitrophenyl, 5-nitro-2,4-xylyl, 4-nitro-2,5-xylyl, 6-nitro-3,4-xylyl, 4-nitro-α,α,α-trifluoro-o-tolyl, 2-amnio-4,5-dichlorophenyl, 4 - amino-3,5-dichlorophenyl, 6-amino - 3,4 - xylyl, 4-chloro-2,5-dimethoxyphenyl, 5-chloro-2,4-dimethoxyphenyl, 5-chloro-4-nitro-o-tolyl;

o-Biphenyl, p-biphenyl, p-phenoxyphenyl, o-(p-chlorophenoxy)-phenyl, p-(p-chlorophenoxy)-phenyl, 5-chloro-2-(p-chlorophenoxy)-phenyl;

Benzyl, o-chlorobenzyl, p-chlorobenzyl, p-methylbenzyl, p-isopropylbenzyl, p-methoxybenzyl, 2,4-dichlorobenzyl, 3,4-dichlorobenzyl, diphenylmethyl, 1,2-diphenylethyl, 2,2-diphenylethyl, 2,2-di-(p-chlorophenyl)-ethyl;

2-pyridyl, 3-pyridyl, 4-pyridyl, 5-chloro - 2 - pyridyl, 5-bromo-2-pyridyl, 6-fluoro-3-pyridyl, 2-chloro-3-pyridyl, 4-methyl-2-pyridyl, 5-methyl - 2 - pyridyl, 6-methyl-2-pyridyl, 6-methoxy - 3 - pyridyl, 6-n-butoxy-3-pyridyl or 4,6-dimethyl-2-pyridyl radical.

$R_6$ is, e.g. a hydrogen or a methyl, ethyl, n-propyl, isopropyl, n-butyl, isobutyl, sec. butyl, n-pentyl, isopentyl or n-hexyl radical.

A, as alkylidene radical, is, e.g. a methylene, ethylidene, propylidene, isoproplyidene, butylidene, isobutylidene or pentylidene radical and, as alkylene radical, it is, e.g. an ethylene, propylene, ethylethylene, trimethylene, tetramethylene or pentamethylene radical.

To produce the compounds of general Formula I, a reactive ester of a 10-hydroxyalkanoyl acridan of the general Formula II

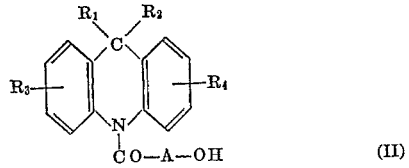

(II)

wherein $R_1$, $R_2$, $R_3$, $R_4$ and A have the meanings given above, for example a halide, preferably a chloride or bromide, an aryl sulphonic acid ester or alkane sulphonic acid ester, is reacted in the presence of an acid binding agent with an amine of the general Formula III

(III)

wherein $R_5$ and $R_6$ have the meanings given above. The reaction is performed in a suitable organic medium, e.g. in a low alkanol or another aliphatic hydroxy compound such as ethanol, n-butyl, 2-methoxyethanol, in an ethereal liquid such as ethylene glycol dimethyl ether and diethylene glycol dimethyl ether, tetrahydrofuran or dioxan, in an aromatic hydrocarbon such as benzene, toluene or xylene, and/or in an excess of an amine of the general Formula III. An excess of the latter can serve at the same time as acid binding agent but, particularly when $R_5$ is phenyl radical which can be substituted, the use of tertiary organic bases such as triethylamine, diisopropyl-ethylamine, pyridine or sym. collidine as acid binding agents can also be advantageous. In general, the reactions are performed at room temperature or at raised temperatures up to about 200°, generally when araliphatic amines are used the reactions are performed at lower temperatures than with aromatic amines Halides as reactive esters of compounds of general Formula II can be activated, e.g. with potassium iodide.

Compounds of the general Formula I wherein $R_6$ is a low alkyl radical are obtained by a second process and a third process which is related thereto, by reacting a compound of the general Formula V,

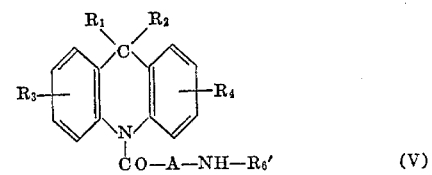

(V)

wherein $R_1$, $R_2$, $R_3$, $R_4$, and A have the meanings given in general Formula I and $R_6'$ represents a low alkyl radical with a reactive ester of a hydroxy compound of the general Formula VI $$R_5'—O \quad\quad (VI)$$

wherein $R_5'$ is a radical corresponding to the definition of $R_5$ with the exception of the phenyl radical and substituted phenyl radicals, or reacting a compound of the general Formula VII

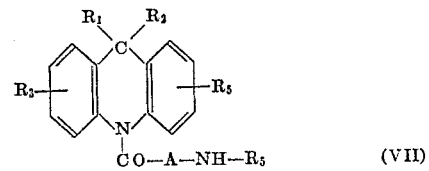

(VII)

wherein $R_1$, $R_2$, $R_3$, $R_4$, $R_5$ and A have the meanings given above and which compound is embraced by general Formula I, with a reactive ester of a low alkanol or, under reducing conditions, with a low oxoalkane. As reactive esters of hydroxy compounds of general Formula VI and of low alkanols, particularly halides, alkane sulphonic acid esters and aryl sulphonic acid esters are used which are reacted with compounds of general Formula V or VII respectively in organic solvents such as methanol, ethanol, acetone, butanone or benzene and, preferably, in the presence of an acid binding agent such as an alkali carbonate. Low oxoalkanes such as formaldehyde and acetaldehyde, are reacted, e.g. in the presence of catalytically activated hydrogen in an inert organic solvent, with compounds of the general Formula VII. Formaldehyde can also be reacted when dissolved in formic acid while heating.

The starting materials for the first production process, reactive esters of compounds of general Formula II, are easily obtained by reacting acridan or substituted acridans of the general Formula IV,

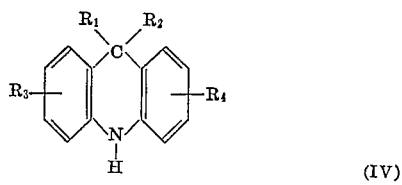

wherein $R_1$, $R_2$, $R_3$ and $R_4$ have the meanings given above, while heating with halogenoalkanoyl halides, alkane sulphonyloxyalkanoyl halides or arylsulphonyloxyalkanoyl halides, the reaction being performed in inert organic solvents such as benzene or toluene. Single representatives of this type of compound, e.g. 10-chloroacetyl-, 10-(3-chloropropionyl)- and 10-(5-iodovaleryl)-acridan are known. A number of substituted acridans of general Formula IV is known and others can be produced analogously.

Starting materials of the general Formula V are obtained, e.g. analogously to the first production process mentioned for end products of the general Formula I. This is also true of the compounds of general Formula VII which are already embraced by the general Formula I. A great number of amines of general Formula III and reactive esters of hydroxy compounds of the general Formula VI is known.

The compounds of general Formula I produced by any one of the processes according to the invention are converted, if desired, into their addition salts with inorganic and organic acids in the usual way. For example, the acid desired as salt component or a solution thereof is added to a solution of a compound of general Formula I in an organic solvent such as methanol, ethanol or ether, and the precipitated salt is isolated. For use as pharmaceuticals instead of the free bases, non-toxic salts are produced, i.e. salts with those acids the anions of which are pharmacologically acceptable in the usual dosages, i.e. they have no toxic effects. In addition, it is of advantage if the salts to be used as pharmaceuticals crystallise well and are not or are only slightly hygroscopic. The following acids can be used, for example, for salt formation with compounds of the general Formula I: hydrochloric acid, hydrobromic acid, sulphuric acid, phosphoric acid, methane sulphonic acid, ethane sulphonic acid, β-hydroxyethane sulphonic acid, acetic acid, lactic acid, oxalic acid, succinic acid, fumaric acid, maleic acid, malic acid, tartaric acid, citric acid, benzoic acid, salicylic acid, phenylacetic acid, mandelic acid and embonic acid.

The new compounds of general Formula I and their pharmaceutically acceptable salts are administered orally, rectally and parenterally. The daily dosages of the free bases or of pharmaceutically acceptable salts thereof vary between 50 and 5000 mg. for adult patients. Suitable dosage units such as dragées (sugar coated tablets), tablets, suppositories or ampoules, preferably contain 10–500 mg. of an active substance according to the invention or of a pharmaceutically acceptable salt thereof. They can also be administered in forms not made up into single dosages such as syrups, sprays, aerosols, ointments or powders.

Dosage units for oral administration preferably contain between 5% and 90% of a compound of general Formula I or of a pharmaceutically acceptable salt thereof as active substance. They are produced, e.g. by combining the active substance with solid, pulverulent carriers such a lactose, sucrose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (Carbowax) of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Dosage units for rectal administration are, e.g. suppositories which consist of a combination of an active substance or a suitable salt thereof with a neutral fatty basis, or also gelatin rectal capsules which contain a combination of the active substance or a suitable salt thereof with polyethylene glycols (Carbowax) of suitable molecular weight.

Ampoules for parenteral, particularly intramuscular administration preferably contain a water soluble salt of an active substance in a concentration of, preferably, 0.5–10%, in aqueous solution, optionally together with suitable stabilising agents and buffer substances.

The following prescription further illustrate the production of tablets and dragées:

(a) 1000 g. of active substance, e.g. 10-[N-(3,4-dichlorobenzyl)-glycyl]-9,9-dimethyl acridan hydrochloride are mixed with 550.0 g. of lactose and 292.0 g. of potato starch, the mixture is moistened with an alcoholic solution of 8 g. of gelatin and granulated through a sieve. After drying, 60.0 of potato starch, 60 g. of talcum, 10.0 g. of magnesium stearate and 20.0 g. of colloidal silica are mixed in and the mixture is pressed into 10,000 tablets each weighing 200 mg. and containing 100 mg. of active substance (hydrochloride). If desired, the tablets can be grooved for subdividing the dosage.

(b) A granulate is produced from 1000 g. of active substance, e.g. 10-[N-(3,4-dichlorophenyl)-glycyl]-acridan, 379.0 g. of lactose and the alcoholic solution of 6.0 g. of gelatin. After drying, the granulate is mixed with 10.0 g. of colloidal silica, 40.0 g. of talcum, 60.0 g. of potato starch and 5.0 g. of magnesium stearate and the mixtures is pressed into 10,000 dragée cores. These are then coated with a concentrated syrup of 533.5 g. of crystallized sucrose, 20.0 g. of shellac, 75.0 g. of gums arabic, 250.0 g. of talcum, 20.0 g. of colloidal silica and 1.50 g. of dyestuff and dried. The dragées obtained each weigh 240 mg. and contain 100 mg. of active substance.

The following non-limitative examples illustrate the invention further. The temperatures are given in degrees centigrade. Percentages are given by weight.

The nomenclature used in this specification and in the appended claims is in conformity with the rules adopted by the International Union of Pure and Applied Chemistry (IUPAC).

Example 1

(a) 16.4 g. (0.057 mol) of 10-(chloracetyl)-9,9-dimethylacridan, 24 g. (0.136 mol) of 3,4-dichlorobenzylamine and 0.1 g. of potassium iodide are dissolved in 100 ml. of ethanol and the solution is refluxed for 24 hours. 80 ml. of ethanol are then distilled off. The precipitated 3,4-dichlorobenzylamine hydrochloride is filtered off under suction and washed with 200 ml. of ether. 50 ml. of 2 N hydrochloric acid are added to the filtrate while stirring whereupon the difficulty soluble 10-[N-(3,4-dichlorobenzyl)-glycyl]-9,9-dimethyl acridan hydrochloride precipitates. This is filtered off under suction and washed with ether. The residue is recrystallized from methanol/ether, M.P. 248° with decomposition.

The following compounds are produced in an analogous manner:

10-[N-(2,4-dichlorobenzyl)-glycyl]-9,9-dimethyl-acridan hydrochloride, M.P. 235° with decomposition;
10-(N-benzyl-glycyl)-9,9-dimethyl-acridan hydrochloride, M.P. 239° with decomposition;
10-[N-(p-chlorobenzyl)-glycyl]-9,9-dimethyl-acridan hydrochloride, M.P. 254° with decomposition;
10-[N-(2,4-dichlorobenzyl)-glycyl]-9-methyl-acridan hydrochloride, M.P. 230° with decomposition;

10-[(2,2-di-(p-chlorophenyl)-äthyl)-glycyl]9,9-dimethyl-acridan hydrochloride, M.P. 246° with decomposition;

10-[N-(3,4-dichlorobenzyl)-glycyl]-9-methyl-acridan hydrochloride, M.P. 248° with decomposition;

9,9-dimethyl-10-[N-(3-pyridyl)-glycyl]-acridan hydrochloride, M.P. 241° with decomposition;

9-ethyl-9-methyl-10-[N-(3,4-dichlorobenzyl)-glycyl]-acridan hydrochloride, M.P. 216° with decomposition;

9,9-dimethyl-10-[N-(5-chloro-2-pyridyl)-glycyl]-acridan hydrochloride, M.P. 180° with decomposition;

9,9-dimethyl-10-[3-(p-chlorobenzylamino)-propionyl]-acridan hydrochloride, M.P. 208° with decomposition;

The above compounds can also be produced, for example, by the methods described in Examples 2 and 4.

(b) The 10-(chloracetyl)-9,9-dimethyl-acridan used as starting material is produced as follows:

104.7 g. (0.50 mol) of 9,9-dimethyl-acridan are dissolved in 500 ml. of abs. benzene and the solution, with 62.0 g. (0.55 mol) of chloracetyl chloride, is refluxed for 3 hours. The reaction mixture is then evaporated to dryness and the residue is recrystallized from methylene chloride/hexane. In this way, 128.7 g. of 10-(chloracetyl)-9,9-dimethyl-acridan, M.P. 134–136°, are obtained.

Example 2

2.855 g. (0.010 mol) of 10-(chloracetyl)-9,9-dimethyl-acridan (compare Example 1), 2.43 g. (0.015 mol) of 3,4-dichloraniline and 2.6 g. (0.020 mol) of diisopropylethylamine are heated for 20 hours in an oil bath at 130–140°. After cooling, a solidified mass is obtained; 20 ml. of water and 20 ml. of ether are added and it is triturated. Undissolved parts are filtered off under suction and washed first with 25 ml. of water and then with 25 ml. of ether. The filter residue is recrystallized from methylene chloride/hexane, whereupon 10-[N-(3,4-dichlorophenyl)-glycyl]-9,9-dimethyl-acridan is obtained, M.P. 240°.

10-[N-(3,4-dichlorobenzyl)-glycyl]-9,9-dimethyl-3-trifluoromethyl-acridan hydrochloride, M.P. 208° with decomposition;

10-[N-(3,4-dichlorophenyl)-glycyl]-9,9-pentamethylene-acridan, M.P. 171°;

10-[N-(4-chloro-3-trifluoromethylphenyl)-glycyl]-9,9-dimethylacridan, M.P. 166°;

10-[N-(5-chloro-(2-chlorophenoxy)-phenyl)-glycyl]-9,9-dimethyl-acridan, M.P. 187°;

10-[N-o-biphenylyl)-glycyl]-9,9-dimethyl-acridan, M.P. 174°;

10-[N-4,5-dichloro-o-tolyl)-glycyl]-9,9-dimethyl-acridan, M.P. 212°;

10-[N-(4-chloro-2,5-dimethoxy-phenyl)-glycyl]-9,9-dimethyl-acridan, M.P. 174°;

10-[N-(p-acetamidophenyl)-glycyl]-9,9-dimethyl-acridan, M.P. 245°;

9,9-dimethyl-10-[N-(p-dimethylaminophenyl)-glycyl]-acridan, M.P. 130°;

10-[N-(4-chloro-3-nitro-phenyl)-glycyl]-9,9-dimethyl-acridan, M.P. 233°;

10-[N-(m-aminophenyl)-glycyl]-9,9-dimethyl-acridan, M.P. 205°;

10-[N-(2,4,5-trichlorophenyl)-glycyl]-9,9-dimethyl-acridan, M.P. 211°;

6-chloro-2-methoxy-10-[N-(3-trifluoromethyl-4-chlorophenyl)-glycyl]-9,9-dimethyl-acridan, M.P. 202°;

9,9-dimethyl-10-(N-phenyl-glycyl)-acridan, M.P. 197°, and

10-[-(p-chlorophenyl)-glycyl]-9,9-dimethyl-acridan, M.P. 216°, for example, are obtained in an analogous way.

The above compounds can also be produced, for example, by the methods described in Examples 1 and 5.

Example 3

18 g. (0.070 mol) of 10-(chloracetyl)-acridan (M.P. 120°, produced analogously to Example 1(b)) and 18.7 g. (0.174 mol) of benzylamine are dissolved in 120 ml. of ethanol and the solution is refluxed for 8 hours. 100 ml. of ethanol are then distilled off. 100 ml. of ether are added to the residue and the precipitated benzylamine hydrochloride is filtered off under suction. The filter residue is washed with 150 ml. of ether. 65 ml. of 2 N hydrochloric acid are added to the filtrate while stirring whereupon the difficulty soluble 10-(N-benzyl-glycyl)-acridan hydrochloride precepitates. This is separated, washed with ether and recrystallized from methanol/ether, M.P. 215° with decomposition.

10-[N-(p-chlorobenzyl)-glycyl]-acridan hydrochloride, M.P. 220° with decomposition, for example, is produced in an analogous way.

The above compounds can also be produced, e.g. by the method described in Example 2.

Example 4

10.3 g. (0.036 mol) of 10-(chloracetyl)-acridan (cf. Example 3), 10 g. (0.061 mol) of 3,4-dichloraniline and 10 g. (0.077 mol) of diisopropylethylamine are heated for 20 hours in an oil bath at 130–140°. After cooling, 80 ml. of water and 80 ml. of ether are added to the solidified mass which is then triturated. Undissolved parts are filtered off under suction and washed first with 100 ml. of water and then with 100 ml. of ether. The filter residue is recrystallised from methylene chloride/hexane whereupon 10.5 g. of 10-[N-(3,4-dichlorophenyl)-glycyl]-acridan are obtained, M.P. 140°.

The following compounds, for example, are produced in an analogous manner:

10-(N-phenyl-glycyl)-acridan, M.P. 167°;
10-[N-(p-chlorophenyl)-glycyl]-acridan, M.P. 190°;
10-[N-(2,4-dichlorophenyl)-glycyl]-acridan, M.P. 190°;
10-[N-(4-chloro-3-trifluoromethylphenyl)-glycyl]-acridan, M.P. 145°;
10-[N-(3,4-xylyl)-glycyl]-acridan, M.P. 138°;
10-[N-(3-trifluoromethylphenyl)-glycyl]-acridan, M.P. 152°;
10-[N-(3,4-dichlorophenyl)-glycyl]-2-methyl-acridan, M.P. 142°;
10-[N-(3,4-dichlorophenyl)-alanyl]-acridan, M.P. 182°;
10-[5-(3,4-dichlorobenzylamino)-valeryl]-acridan hydrochloride, M.P. 157° with decomposition.

The above compounds can also be produced, for example, by the methods described in Examples 1 and 5.

Example 5

12.6 g. (0.042 mol) of 10-(3-chloropropionyl)-9,9-dimethyl-acridan (M.P. 137–138°, produced analogously to Example 1(b)), 53 g. (0.415 mol) of p-chloraniline, 1 g. of potassium iodide and 100 ml. of n-butanol are refluxed for 14 hours. After cooling, 4.2 g. (0.050 mol) of sodium bicarbonate are added and the excess p-chloraniline and also the n-butanol are distilled off with steam. The residue is taken up in ether, the ethereal solution is washed with water, dried over sodium sulphate and concentrated. 16 g. of a brown oil are obtained. This is chromatographed on a column containing 500 g. of aluminum oxide (grade II according to Brockmann). Elution is begun with hexane and continued with benzene. The fractions containing the 10-[N-(p-chlorophenyl)-β-alanyl]-9,9-dimethylacridan, are combined (12 g.) and recrystallized from methylene chloride/hexane. M.P. 164°.

To prepare the hydrochloride, the base (8.2 g.) is dissolved in 100 ml. of ether and 22 ml. of 1 N ethereal hydrochloric acid solution are added. The salt which precipitates is recrystallized from methanol/ether. M.P. 192° with decomposition.

10-[N-(p-chlorophenyl) - β - alanyl] - 9,9 - dimethyl-acridan can also be produced, e.g. by the methods described in Examples 2 and 4.

Example 6

4.0 g. (0.009 mol) of 10-[N-(2,4-dichlorobenzyl)-glycyl]-9,9-dimethyl-acridan (from the hydrochloride, M. P. 235° with decomposition) are dissolved in 1.6 g. (0.030 mol) of 85% formic acid and 2 ml. (0.020 mol) of a 40% formalin solution, is added while stirring at room temperature. After the gas development has decreased, the reaction mixture is heated for 8 hours in an oil bath (bath temperature 100–110°). After cooling, 3 ml. of 5 N hydrochloric acid are added and the mixture is evaporated to dryness under reduced pressure. To the residue which consists of the hydrochloride of 10[-(2,4-dichlorobenzyl)-N-methyl-glycyl]-9,9-dimethyl-acridan is added 100 ml. of methylene chloride and the free base is liberated from by adding 20 ml. of 2 N sodium hydroxide solution. The methylene chloride solution is washed three times with 50 ml. of water each time, dried over $CaCl_2$ and the solvent evaporated. The residue (3.9 g.) is dissolved in 100 ml. of ether and converted into the hydrochloride with 3 ml. of ethereal 3 N hydrochloric acid solution. The precipitated hydrochloride is filtered off under suction and recrystallized from methylene chloride/hexane. 3.0 g. of 10-[N-(2,4-dichlorobenzyl)-N-methyl-glycyl] - 9,9 - dimethyl-acridan hydrochloride are thus obtained, M.P. 204–205° with decomposition.

Example 7

1.79 g. (0.0042 mol) of 10-[N-(2,4-dichlorobenzyl)-glycyl]-9,9-dimethyl-acridan, from the hydrochloride, M.P. 235° with decomposition, are dissolved in 70 ml. of methanol and the solution, with 1.6 ml. (0.026 mol) of methyl iodide, is refluxed for 6 hours. The reaction mixture is then evaporated to dryness under reduced pressure, 10 ml. of 2 N sodium hydroxide solution are added to the residue, this is then extracted with 50 ml. of ether and the ether solution is washed twice with 15 ml. of water each time. After evaporating the ether, the resulting residue (1.7 g.) is dissolved in 50 ml. of ether and 2 ml. of ethereal 3 N hydrochloric acid solution are added. The 10-[N-(2,4-dichlorobenzyl) - N - methyl-glycyl]-9,9-dimethyl-acridan hydrochloride which precipitates is recrystallized from methylene chloride/hexane. M.P. 204–205° with decomposition.

Example 8

8.4 g. (0.03 mol) of 9,9-dimethyl-10-(N-methyl-glycyl)-acridan M.P. 115°, 3.9 g. (0.03 mol) of benzyl chloride and 7.8 g. (0.06 mol) of diisopropylethylamine are heated for 20 hours on an oil bath at 140–150°. After cooling, the reaction product is extracted with 300 ml. of ether and 100 ml. of water, the aqueous phase is removed and the ether solution is washed with 50 ml. of 2 N sodium hydroxide solution and 3 times with 50 ml. of water each time. After evaporating the ether, the resulting residue (12.0 g.) is dissolved in 30 ml. of acetone, 4.5 g. of oxalic acid dihydrate are added and the solution is left to stand. The 10-(N-benzyl-N-methyl-glycyl)-9,9-dimethyl-acridan sesquioxalate crystallises out. It melts at 190° with decomposition.

According to a second aspect of the invention, it has been found that novel acridan derivatives falling under the formula

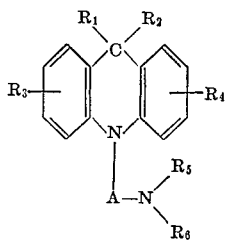

(I)

wherein:

$R_1$ represents a lower alkyl radical,
$R_2$ represents hydrogen or a lower alkyl radical or $R_1$ and $R_2$ together represent a polymethylene bridge, so that these symbols $R_1$ and $R_2$ together with the carbon atom to which they are linked represent, in particular, a five-membered, six-membered or seven-membered saturated carbocyclic ring, each of $R_3$ and $R_4$, independently of the other, represents hydrogen, halogen up to the atomic number 35 inclusive, trifluoromethyl or a lower alkyl or lower alkoxy radical, $R_5$ represents a phenyl radical, or a biphenylyl or phenoxyphenyl radical, the benzene nuclei of all of which can contain at most three substituents from the group formed by halogen atoms, trifluoromethyl radicals, nitro groups, amino groups and lower alkyl, lower alkoxy, lower alkylamino, di-lower alkylamino and lower alkanoylamino radicals, or it represents a pyridyl radical optionally substituted by halogen atoms, lower alkyl or lower alkoxy radicals, $R_6$ represents hydrogen or a lower alkyl radical, and
A represents an alkylene radical having 2–6 carbon atoms, and their addition salts with inorganic and organic acids, have valuable pharmacological properties, particularly excellent antiviral activity, on the one hand, and tumor-inhibiting activity, on the other hand, combined with a favourable therapeutic index. The antiviral activity has been determined by animal tests, e.g. on mice against Columbia-SK virus, and tumor-inhibiting activity has been found in animal tests, e.g. on methylcholanthrene sarcoma or on dimethylbenzanthracene skin-tumors experimentally induced into mice. The animal test characterise compounds of Formula I and their acid addition salts as active substances for the treatment of virus diseases such as encephalitis, encephalomyelitis and others, as well as for the treatment of neoplasia. Moreover, compounds of Formula I and their acid addition salts show a mild analgetic activity.

In the description of this second aspect of the invention, wherever reference is made to preceding numbers of formulas or examples, it is to the identified formula or example in connection with this second aspect of the invention.

Compounds of Formula I which show broad antiviral activity and especially significant activity against Columbia SK virue, Herpes simplex virus and influenza A–PR 8 virus, are those falling under Formula I, in which $R_5$ represents unsubstituted phenyl or phenyl substituted by halogen having an atomic number of up to 35 inclusive, trifluoromethyl, lower alkyl and/or lower alkoxy radicals, and especially halogeno-phenyl or halogeno-trifluoromethylphenyl. A in these compounds is preferably an ethylene or trimethylene radical.

More in particular, compounds falling under Formula I in which A represents a trimethylene bridge, and in which $R_5$ is phenyl or halogen-substituted phenyl, especially fluorophenyl, and $R_6$ is preferably hydrogen, as well as the pharmaceutically acceptable salts thereof with acids, exhibit a very interesting and entirely unexpected combination of antiviral activity, especially against Columbia SK virus, with a mild analgesic activity; this combined activity indicates usefulness of these agents in the treatment of encephalitis and related virus diseases accompanied by pains, e.g. headache, whereby the often undesirable administration of two possibly insufficiently compatible medicaments, which are not well tolerated by certain individuals when applied jointly, can be avoided.

We have also found that known acridans the structure of which has certain similarities with that of the compounds of Formula I, and which have been recommended because of either antihistaminic, adrenolytic, sedative, hypothermic, or psychopharmaceutical effects, lack at least one, or even both of the properties making up the above described novel combination, in significant amount, and thus do not possess the above-mentioned, quite rare usefulness as combined antiviral-analgesic agents.

On the other hand, compounds falling under Formula I in which $R_5$ represents a preferably chlorine-substituted phenoxyphenyl radical or a preferably chlorine-substituted pyridyl radical, are distinguished by pronounced tumor growth-inhibiting properties, while they show no or only minor significance antiviral activities, especially against the last-mentioned type of virus.

In the compounds of Formula I and the corresponding starting materials given below, $R_1$ and $R_2$ represent methyl, ethyl or n-propyl radicals, isopropyl, n-butyl or isobutyl radicals or, together they form, e.g. the tetramethylene, pentamethylene or hexamethylene radical, $R_2$ can also represent hydrogen. $R_3$ and $R_4$ independently of each other represent, e.g. hydrogen, fluorine, chlorine or bromine atoms, trifluoromethyl, methyl, ethyl, n-propyl, isopropyl, methoxy, ethoxy, n-propoxy or isopropoxy radicals. $R_5$ is, e.g. a phenyl, o-, m- or p-fluorophenyl, o-, m- or p-chlorophenyl, o- or p-bromophenyl, o-,m- or p-iodophenyl, $\alpha,\alpha,\alpha$-trifluoro - o - tolyl, $\alpha,\alpha,\alpha$-trifluoro-m-tolyl, $\alpha,\alpha,\alpha$-trifluoro-p-tolyl, o- m- or p-tolyl, o-ethylphenyl, p-ethylphenyl, p-isopropylphenyl, o-, m- or p-methoxyphenyl, p-ethoxyphenyl, p - (n - propoxy)-phenyl, p-isopropoxyphenyl, o-, m- or p-nitrophenyl, o-, m- or p-aminophenyl, o, m- or p-acetamidophenyl, p-dimethylaminophenyl, p-diethylaminophenyl, p-ethylaminophenyl, 2,4- or 2,5-difluorophenyl, 2,3-, 2,4-, 2,5- 3,4-, 3,5- or 2,6-dichlorophenyl, 2,4-, 2,5-, or 2,6-dibromophenyl, 2,3-, 2,4-, 2,5-, 2,6-, 3,4-, or 3,5-xylyl, 2,4-diethylphenyl, 2,4-, 2,5-, 3,4- or 3,5-dimethoxyphenyl, 2,5-diethoxyphenyl, 2,4,5-trichlorophenyl, 2,4,5-trimethylphenyl, mesityl, 3,4,5-trimethoxyphenyl, 3-chloro-4-fluorophenyl, 4-fluoro-o-tolyl, 5-fluoro-o-tolyl, 4-fluoro-m-tolyl, 2- or 3-fluoro-p-tolyl, 4- 5- or 6-chloro-o-tolyl, 2-chloro-p-tolyl, 2-bromo-p-tolyl, 4-iodo-o-tolyl, 3-iodo-p-tolyl, 4,$\alpha,\alpha,\alpha$-tetrafluoro-o-tolyl, 4,$\alpha,\alpha,\alpha$-tetrafluoro-m-tolyl, 6,$\alpha,\alpha,\alpha$-tetrafluoro-m-tolyl, 4-chloro-$\alpha,\alpha,\alpha$-trifluoro-o-tolyl, 4-chloro - $\alpha,\alpha,\alpha$ - trifluoro-m-tolyl, 6-chloro-$\alpha,\alpha,\alpha$-trifluoro-m-tolyl, 4 - bromo-$\alpha,\alpha,\alpha$-trifluoro-o-tolyl, 4-bromo-$\alpha,\alpha,\alpha$-trifluoro-m-tolyl, 6-bromo-$\alpha,\alpha,\alpha$-trifluoro-m-tolyl, 3-chloro-6-methoxyphenyl, 4-methoxy-o-tolyl, 4-chloro-2-nitrophenyl, 4-chloro - 3 - nitrophenyl, 2-bromo-4-nitrophenyl, 4-, 5- and 6-nitro-o-tolyl, 2- and 3-nitro-p-tolyl, 4-nitro-$\alpha,\alpha,\alpha$-trifluoro-m-tolyl, 2-nitro-$\alpha,\alpha$,$\alpha$-trifluoro-p-tolyl, 2-methoxy-5-nitrophenyl, 2-methoxy-6-nitrophenyl, 4-methoxy-2-nitrophenyl, 2-amino-4-methoxyphenyl, 4,5-dichloro-o-tolyl, 2,4 - dichloro - 6 - nitrophenyl, 2,5-dichloro-4-nitrophenyl, 4,5-dichloro-2-nitrophenyl, 5-nitro-2,4-xylyl, 4-nitro-2,5-xylyl, 6-nitro-3,4-xylyl, 4-nitro-$\alpha,\alpha,\alpha$-trifluoro-o-tolyl, 2-amino-4,5-dichlorophenyl, 4-amino-3,5-dichlorophenyl, 6-amino-3,4-xylyl, 4-chloro-2,5-dimethoxyphenyl, 5-chloro - 2,4 - dimethoxyphenyl, 5-chloro-4-nitro-o-tolyl;

o-Biphenylyl, p - biphenylyl, p - phenoxyphenyl, o-(p-chlorophenoxy)-phenyl, p - (p - chlorophenoxy) - phenyl, 5-chloro-2-(p-chlorophenoxy)-phenyl;

2 - pyridyl, 3 - pyridyl, 4 - pyridyl, 5 - chloro-2-pyridyl, 5-bromo-2-pyridyl, 6-fluoro-3-pyridyl, 2-chloro-3-pyridyl, 4-methyl-2-pyridyl, 5-methyl-2-pyridyl, 6-methyl-2-pyridyl, 6-methoxy-3-pyridyl, 6-ethoxy-3-pyridyl, 6-n-butoxy-3-pyridyl, or 4,6-dimethyl-2-pyridyl radical.

$R_6$ is, for example, hydrogen or a methyl, ethyl, n-propyl, isopropyl, n-butyl, isobutyl, sec. butyl, n-pentyl, isopentyl or n-hexyl radical.

A is, for example, an ethylene, propylene, ethyl-ethylene, trimethylene, tetramethylene, pentamethylene or hexamethylene radical.

To produce the compounds of general Formula I a reactive ester of a 10-hydroxyalkyl-acridan of the general Formula II

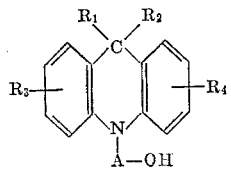
(II)

wherein $R_1$, $R_2$, $R_3$, $R_4$ and A have the meanings given above, for example a halide, preferably a chloride or bromide, an aryl sulphonic acid ester or alkane sulphonic acid ester, is reacted in the presence of an acid binding agent with an amine of the general Formula III

(III)

wherein $R_5$ and $R_6$ have the meanings given above. The reaction is performed in a suitable organic medium, e.g. in a low alkanol or another aliphatic hydroxy compound such as ethanol, n-butanol, 2-methoxyethanol, in an ethereal liquid such as ethylene glycol and diethylene glycol dimethyl ether, tetrahydrofuran or dioxan, in a benzene hydrocarbon such as benzene, toluene or xylene, and/or in an excess of amine of the general Formula III. An excess of the latter can serve at the same time as acid binding agent but, particularly when $R_5$ is a phenyl radical which can be substituted, the use of tertiary organic bases such as triethylamine, diisopropylethyl amine, pyridine or sym. collidine as acid binding agent can also be advantageous. The reactions are generally performed at room temperature or at an elevated temperature up to about 200°. Halides, as reactive esters of compounds of the general Formula II, can be activated, e.g. with sodium or potassium iodide.

Compounds of the general Formula I having a low alkyl radical as $R_6$ are produced by a second process by reacting a metal compound of an acridan of the general Formula IV

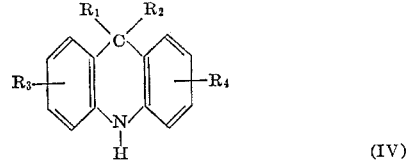
(IV)

wherein $R_1$, $R_2$, $R_3$ and $R_4$ have the meanings given above, with a reactive ester of a compound of the general Formula V

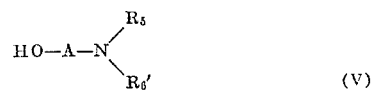
(V)

wherein $R_6'$ represents a low alkyl radical and $R_5$ and A have the meanings given above. The reactions are performed in the presence or absence of an inert organic solvent, e.g. a hydrocarbon such as benzene, toluene or xylene, ethereal liquids, e.g. dioxan, tetrahydrofuran, ethylene glycol dimethyl ether or diethylene glycol dimethyl ether, or in dimethyl formamide, e.g. at temperatures between 20° and 180°. An alkali metal compound formed in situ, e.g. with sodium or lithium amide, sodium or lithium hydride, serves in particular as metal compound.

A third process for the production of compounds of the general Formula I consists in reducing a compound of the general Formula VI

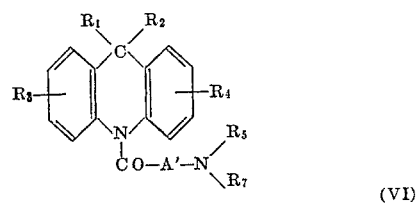
(VI)

wherein A' represents an alkylidene or alkylene radical having 1 to 5 carbon atoms and $R_1$, $R_2$, $R_3$, $R_4$, $R_5$ and $R_6$ have the meanings given above, with diboran in an ethereal liquid. Tetrahydrofuran, dioxan, methylene glycol dimethyl ether or diethylene glycol dimethyl ether are examples of reaction media. The reaction temperature is preferably between room temperature and about 100° and the duration is between about 30 minutes and 24 hours. The diboran, for example, is either developed from borontrifluoride etherate and sodium borohydride in a separate apparatus and then introduced into the reaction mixture, or it is formed in situ.

Compounds of the general Formula I wherein $R_6$ represents a low alkyl radical are produced by a fourth process by heating a compound of the general Formula VII

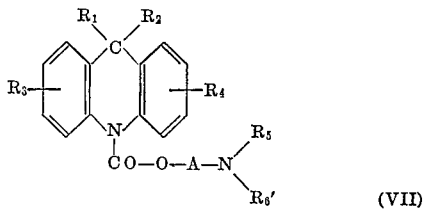

wherein $R_1$, $R_2$, $R_3$, $R_4$, $R_5$, $R_6'$ and A have the meanings given in general Formulae I and V respectively, until the equimolar amount of carbon dioxide is split off. The decarboxylation is performed in the presence or absence of a higher boiling, inert organic solvent such as decalin, tetralin, mesitylene etc.

Compounds of general Formula I wherein $R_6$ is a low alkyl radical are produced by a fifth process, by reacting a compound of the general Formula VIII

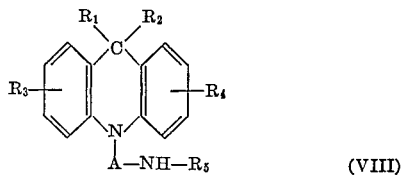

wherein $R_1$, $R_2$, $R_3$, $R_4$, $R_5$ and A have the meanings given above, with a reactive ester of a low alkanol or by reacting the compound of general Formula VIII with a low oxoalkane under reducing conditions. As reactive esters of low alkanols, particularly halides, alkane sulphonic acid esters and aryl sulphonic acid esters are used which are reacted with compounds of the general Formula VIII in organic solvents such as alcohols, e.g. methanol, ethanol, n-butanol, benzyl alcohol, hydrocarbons such benzene or toluene, or ethereal liquids such as dioxan, tetrahydrofuran, ethylene glycol dimethyl ether and, preferably in the presence of an acid binding agent, e.g. triethylamine, diisopropylethylamine, collidine or an alkali carbonate and, optionally in the presence of a catalyst such as sodium or potassium iodide. Low oxoalkanes such as formaldehyde and acetaldehyde are reacted, e.g. in the presence of catalytically activated hydrogen in an inert organic solvent, with the compounds of general Formula VIII; formaldehyde can also be reacted in the presence of formic acid while heating.

Finally, compounds of the general Formula I wherein $R_1$ and $R_2$ are low alkyl radicals or, together, they represent a polymethylene radical are produced by a sixth process by reacting a compound of the general Formula IX

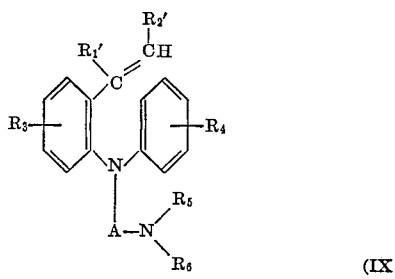

wherein:

$R_1'$ represents a low alkyl radical, $R_2'$ represents hydrogen, a low alkyl radical or, together with $R_1'$, a polymethylene radical, and $R_3$, $R_4$, $R_5$, $R_6$ and A have the meanings given in claim 1, with an acid condensing agent, e.g. borotrifluoride, the reaction being performed in an inert solvent such as benzene or concentrated sulphuric acid.

Starting materials of the general Formulae III, IV, IX as well as reactive esters of compounds of the general Formulae II and V are known and others can be produced analogously to the known compounds. Compounds of general Formula VI are produced, for example, by reacting 10- halogenoalkanoyl-acridans which are optionally substituted corresponding to the definitions given for $R_1$, $R_2$, $R_3$ and $R_4$ and of which some are known, with amines of the general Formula III. The reaction is performed analogously to that of reactive esters of compounds of general Formula II with amines of the general Formula III. Starting materials of the general Formula VII can be produced by reacting acridans of the general Formula IV with phosgene in suitable inert organic solvents such as benzene or toluene, and reacting the 10-chlorocarbonyl-acridans obtained with hydroxy compounds of the general Formula V. The starting materials of the general Formula VIII which are already embraced by general Formula I, are obtained analogously to the first general production process mentioned by reacting reactive esters of hydroxy compounds of the general Formula II with primary amines of general Formula III. Starting materials of the general Formula IX are formed analogously to the end products of general Formula I if, in the production process mentioned above for the latter, corresponding diphenylamine derivatives are used instead of acridans or acridan derivatives.

The compound of general Formula I produced by any of the processes according to the invention are converted, if desired, into their addition salts with inorganic and organic acids in the usual way. For example, the acid desired as salt component or a solution thereof is added to a solution of a compound of general Formula I in an organic solvent such as methanol, ethanol or ether and the salt precipitated is isolated. For use as pharmaceuticals, non toxic salts are produced instead of the free bases, i.e. salts with those acids the anions of which are pharmacologically acceptable in the usual dosages, i.e. those which have no toxic effects. It is also of advantage if the salts to be used as pharmaceuticals crystallise well and are not or are only slightly hygroscopic. Hydrochloric acid, hydrobromic acid, sulphuric acid, phosphoric acid, methane sulphonic acid, ethane sulphonic acid, β-hydroxyethane sulphonic acid, acetic acid, lactic acid, oxalic acid, succinic acid, fumaric acid, maleic acid, malic acid, tartaric acid, citric acid, benzoic acid, salicylic acid, phenyl acetic acid, mandelic acid and embonic acid are used, for example, for salt formation with compounds of the general Formula I.

The new compounds of general Formula I and their pharmaceutically acceptable salts are administered orally, rectally and parenterally. The daily dosages of the free bases or of pharmaceutically acceptable salts thereof vary between 50 and 5000 mg. for adult patients. Suitable dosage units such as dragées (sugar coated tablets), tablets, suppositories or ampoules preferably contain 10–500 mg. of an active substance according to the invention or a pharmaceutically acceptable salt thereof. In addition, corresponding amounts of forms not made up into single dosages such as syrups, sprays, aerosols, ointments or powders can also be administered.

Dosage units for oral administration preferably contain between 5% and 90% of a compound of general Formula I or of a pharmaceutically acceptable salt thereof as active substance. They are produced, e.g. by combining the active substance with solid pulverulent carriers such as lactose, sucrose, sorbitol, mannitol, starches such as potato starch, maize starch or amylopectin, also laminaria powder or citrus pulp powder; cellulose derivatives of gelatin, optionally with the addition of lubricants such as magnesium or calcium stearate or polyethylene glycols (Carbowax) of suitable molecular weights, to form tablets or dragée cores. The latter are coated, e.g. with concentrated sugar solutions which can also contain, e.g. gum arabic, talcum and/or titanium dioxide or with a lacquer dissolved in easily volatile organic solvents or mixtures of solvents. Dyestuffs can be added to these coatings, e.g. to distinguish between varying dosages of active substance.

Dosage units for rectal administration are, e.g. suppositories which consist of a combination of an active ingredient or a suitable salt thereof with a neutral fatty basis, or also gelatin rectal capsules which contain a combination of the active substance or a suitable salt thereof with polyethylene glycols (Carbowax) of suitable molecular weight.

Ampoules for parenteral, particularly intramuscular administration preferably contain a water soluble salt of an active substance in a concentration of preferable 0.5–10%, in aqueous solution, optionally together with suitable stabilising agents and buffer substances.

The following prescriptions further illustrate the production of tablets and dragées:

(a) 1000 g. of active substance, e.g. 10-(3-anilinopropyl)-9,9-dimethyl-acridan hydrochloride are mixed with 550.0 g. of lactose and 292.0 g. of potato starch, the mixture is moistened with an alcoholic solution of 8 g. of gelatin and granulated through a sieve. After drying, 60.0 g. of potato starch, 60.0 g. of talcum, 10.0 g. of magnesium stearate and 20.0 g. of colloidal silica are mixed in and the mixture is pressed into 10,000 tablets each weighing 200 mg. and containing 100 mg. of active substance (hydrochloride). If desired the tablets can be grooved for subdividing the dosage.

(b) A granulate is prepared from 1,000 g. of active substance, e.g. 10-[3-(4-chloro-$\alpha,\alpha,\alpha$-trifluoro-m-toluidino-propyl]-9,9-dimethyl-acridan, 379.0 g. of lactose and the alcoholic solution of 6.0 g. of gelatin. After drying, the granulate is mixed with 10.0 g. of colloidal silica, 40.0 g. of talcum, 60.0 g. of potato starch and 5.0 g. of magnesium stearate and the mixture is pressed into 10,000 dragée cores. These are then coated with a concentrated syrup of 533.5 g. of crystallised sucrose, 20.0 g. of shellac, 75.0 g. of gum arabic, 250.0 g. of talcum, 20.0 g. of colloidal silica and 1.5 g. of dyestuff and dried. The dragées obtained each weight 240 mg. and contain 100 mg. of active substance.

The following non-limitative examples illustrate the invention further. The temperatures are given in degrees centigrade. Percentages are given by weight unless expressly stated otherwise.

Example 1

12.0 g. (0.042 mol) of 10-(3-chloropropyl)-9,9-dimethyl-acridan, 12.4 g. (0.063 mol) of 4-chloro-$\alpha,\alpha,\alpha$-trifluoro-m-toluidine and 10.8 g. (0.084 mol) of diisopropylethylamine are heated for 16 hours in an oil bath at 135–140° while stirring. After cooling, 120 ml. of 1 N sodium hydroxide solution are added and the whole is extracted with ether. The ethereal phase is washed neutral with water, dried over sodium sulphate and concentrated. 21.2 g. of a viscous brown oil remain which is recrystallised from ethanol/water, whereupon 10-[3,(4-chloro-$\alpha,\alpha,\alpha$-trifluoro-m-toluidino)-propyl]-9,9-dimethyl-acridan are obtained, M.P. 108–110°.

The following compounds, for example, are produced in an analogous manner:

10-[3-(2,4-dichloranilino)-propyl]-9,9-dimethyl-acridan, M.P. 77–78°;
9,9-dimethyl-10-[3-p-fluoranilino)-propyl]-acridan, M.P. 68–69°, hydrochloride, M.P. 199–206° with decomposition;
10-[3-(3,4-dichloranilino)-propyl]-9,9-dimethyl-acridan, M.P. 104–106°;
10-[3-(p-bromanilino)-propyl]-9,9-dimethyl-acridan hydrochloride, M.P. 196–200°;
10-[3-[5-chloro-2-(p-chlorophenoxy)-anilino]-propyl]-9,9-dimethyl-acridan, M.P. 102–104°;
10-[3-(p-acetamido-anilino)-propyl]-9,9-dimethyl-acridan hydrochloride, M.P. 238°;
10-[3-(6-ethoxy-3-pyridylamino)-propyl]-9,9-dimethyl-acridan dihydrochloride, M.P. 154°;
9-ethyl-10-[3-(4-chloro-$\alpha,\alpha,\alpha$-trifluoro-m-toluidino)-propyl]-9-methyl-acridan.

The 10-(3-chloropropyl)-9,9-dimethyl-acridan used as starting material is produced as follows:

41.9 g. (0.2 mol) of 9,9-dimethyl-acridan are dissolved in 250 ml. of anhydrous toluene and a suspension of 3.9 g. (0.24 mol) of sodium amide in 30 ml. of anhydrous toluene is added while stirring under an atmosphere of nitrogen. The mixture is heated to the boil for 30 minutes while stirring until no more ammonia is developed. It is then left to cool to 45° when 63 g. (0.4 mol) of 1-bromo-3-chloropropane are added. The reaction mixture is then stirred for 2 hours at 50° and afterwards for 17 hours at 85°. 50 ml. of an 0.5 N hydrochloric acid solution and 300 ml. of ether are then added while cooling with ice. The phases are separated in a separating funnel, the ethereal phase is washed neutral with water, dried over sodium sulphate and concentrated. The residue is dried under water jet vacuum for 2 hours at a bath temperature of 40–50° whereupon the desired substance is obtained as a viscous brown oil.

Example 2

17.1 g. (0.06 mol) of 10-(3-chloropropyl)-9,9-dimethyl-acridan and 28 g. (0.30 mol) of aniline are heated within 30 minutes to 100° while stirring and stirred for 9 hours at this temperature. The reaction mixture is flushed into a separating funnel with 30 ml. of glacial acetic acid; then 100 ml. of petroleum ether, 50 ml. of ether and 200 ml. of water are added thereto and the whole is well shaken. This causes the excess aniline to dissolve and the acetate of 10-(3-anilino-propyl)-9,9-dimethyl-acridan to precipitate as a grease. The acetate is removed and the base is liberated with 2 N sodium hydroxide solution. This is taken up in ether, the ethereal solution is washed neutral with water, dried over sodium sulphate and concentrated. About 20 g. of a brown oil are obtained. This is dissolved in 150 ml. of ether and 50 ml. of a 1.3 N ethereal hydrochloric acid solution are added. The precipitated hydrochloride is filtered off under suction and recrystallised from acetone/ether. The 10-(3-anilino-propyl)-9,9-dimethyl-acridan hydrochloride melts at 147–150° with decomposition.

The following compounds, e.g. are produced in an analogous way:

9,9-dimethyl-10-[3-(p-toluidino)-propyl]-acridan hydrochloride, M.P. 164–167° with decomposition;
9,9-dimethyl-10-[3-(2-pyridylamino)-propyl]-acridan hydrochloride, M.P. 277° with decomposition.

Example 3

14.3 g. (0.05 mol) of 10-(3-chloropropyl)-9,9-dimethyl-acridan, 64 g. (0.50 mol) of p-chloraniline, 1 g. of potassium iodide and 100 ml. of n-butanol are refluxed for 21 hours. 25 ml. of 2 N sodium hydroxide solution are then added and the excess p-chloraniline is distilled off with steam. The distillation residue is extracted with ether, the ethereal solution is washed neutral with water, dried over sodium sulphate and concentrated. The residue, 17 g. of a brown oil, is chromatographed on a column containing 500 g. of aluminium oxide (grade II according to Brockmann). The fractions eluted with hexane/20% benzene contain 8 g. of 10-[3-(p-chloranilino)-propyl]-9,9-dimethyl-acridan. This is dissolved in 100 ml. of ether and converted into the hydrochloride with ethereal hydrochloric acid, M.P. 205–212°.

Example 4

7.2 g. (0.017 mol) of 10-[n-(4,5-dichloro-2-methylphenyl)-glycyl]-9,9-dimethyl-acridan are dissolved in 50 ml. of anhydrous tetrahydrofuran and the solution is cooled with an ice bath. Diboran (generated from 2.38 g. of sodium borohydride and 13.1 g. of borontrifluoride etherate in 15 ml. of diethylene glycol dimethyl ether) are introduced into this solution while excluding moisture and stirring. The reaction mixture is then refluxed for 1 hour, after which a solution of 3 ml. of concentrated hydrochloric acid and 3 ml. of water is added dropwise while cooling with ice. The reaction mixture so obtained is concentrated in vacuo. The residue is taken up in ether, the ethereal solution is shaken with dilute ammonia solution, washed neutral with water, dried over sodium sulphate and concentrated. After recrystallisation from methylenechloride/ hexane the 10-[2-(4,5-dichloro-2-methylanilino)-ethyl]-9,9-dimethyl-acridan obtained melts at 156–158°.

The following compounds, e.g. are produced in an analogous way:

9,9-dimethyl-10-[3-(5-chloro-2-pyridylamino)-propyl]-acridan hydrochloride, M.P. 279°;

10-[2-(4-chloro-3,6-dimethoxy-anilino)-ethyl]-9,9-dimethyl-acridan, M.P. 155°;

10[2-(o-biphenylyl-amino)-ethyl]-9,9-dimethyl-acridan, M.P. 117°;

9,9-dimethyl-10-[2-(p-dimethylamino-anilino)-ethyl]-acridan maleate, M.P. 157° with decomposition;

10-[2-(4-chloro-3-nitro-anilino)-ethyl]-9,9-dimethyl-acridan, M.P. 115°;

10-[2-(p-ethylamino-anilino)-ethyl]-9,9-dimethyl-acridan hydrochloride, M.P. 192–193°;

6-chloro-10-[2-(4-chloro-$\alpha,\alpha,\alpha$-trifluoro-m-toluidino)-ethyl]-9,9-dimethyl-2-methoxy-acridan hydrochloride, M.P. 170–180° with decomposition;

10-[2-(3-amino-anilino)-ethyl]-9,9-dimethyl-acridan dihydrochloride, M.P. 206–208° with decomposition;

10-[2-(3,4-dichloranilino)-ethyl]-9,9-pentamethylene-acridan hydrochloride, M.P. 161–168° with decomposition;

6-chloro-10-[2-(4-chloro-$\alpha,\alpha,\alpha$-trifluoro-m-toluidino)-ethyl]-9,9-dimethyl-2-methyl-acridan hydrochloride, M.P. 151–157° with decomposition;

10-(2-anilinoethyl)-9-methyl-acridan;

10-[2-(3,4-dichloranilino)-ethyl]-9,9-dimethyl-3-trifluoromethyl-acridan;

9,9-dimethyl-10-[3-(5-methyl-2-pyridylamino)-ethyl-acridan.

The starting material used in this example is produced as follows:

104.7 g. (0.50 mol) of 9,9-dimethyl-acridan are dissolved in 500 ml. of anhydrous benzene and the solution is refluxed with 62.0 g. (0.55 mol) of chloracetyl chloride for 3 hours. The reaction mixture is then evaporated to dryness and the residue is recrystallised from methylene chloride/hexane. In this way, 128.7 g. of 10-chloracetyl-9,9-dimethyl-acridan are obtained, M.P. 134–136°.

28.5 g. (0.1 mol) of 10-chloracetyl-9,9-dimethyl-acridan, 17.6 g. (0.1 mol) of 4,5-dichlor-o-toluidine and 25.8g. (0.2mol) of diisopropylethylamine are heated for 20 hours in an oil bath at 130–140°. After cooling, 200 ml. of hexane and 150 ml. of 2 N hydrochloric acid are added and the solidified mass is triturated therewith. The insoluble part is filtered off under suction and washed first with 50 ml. of water and then with 50 ml .of hexane.

The filter residue is recrystallised from dioxan/water whereupon 10-[N-(4,5-dichloro - 2 - methylphenyl)-glycyl]-9,9-dimethyl-acridan is obtained, M.P. 206–209°.

Example 5

4.2 g. (0.02 mol) of 9,9-dimethyl-acridan, M.P. 123–124°, are dissolved, under an atmosphere of nitrogen, in 25 ml. of anhydrous toluene. 25 ml. (0.02 mol) of a sodium amide suspension in anhydrous toluene are added while stirring and the reaction mixture is refluxed for 40 minutes. A solution of 3.2 g. (0.02 mol) of N-(2-chlorethyl)-N-methyl-aniline in 20 ml. of anhydrous toluene is then added and the whole is refluxed for another 14 hours. 50 ml. of water are then added and the reaction mixture is extracted with 200 ml. of ether. The ethereal solution is washed neutral with water, dried over sodium sulphate and concentrated. The residue (7.0 g.) is chromatographed on 200 g. of aluminium oxide (grade II according to Brockmann). The fractions eluted with hexane contain the 9,9-dimethyl-10-[2-(N-methylanilino)-ethyl]-acridan. Recrystallised from hexane it melts at 87–88°.

10 - [2 - N-ethyl - 3,4 - dichloranilino) - ethyl]9,9-dimethyl-acridan, for example, is produced in an analogous manner.

Example 6

0.58 g. (0.0015 mol) of 9,9-dimethyl-acridan-10-carboxylic acid-2-(N-methylanilino)-ethyl ester are heated for 3 hours under water jet vacuum (11 torr) at 200–210° until no more carbon dioxide is developed. The crude pyrolysis product is chromatographed on 15 g. of aluminium oxide (grade II according to Brockmann). The fractions eluted with hexane contain the 9,9-dimethyl - 10 - [2-(N-methylanilino)-ethyl]-acridan. Recrystallised from hexane, it melts at 87–88°.

The 9,9-dimethyl - acridan-10-carboxylic acid-2-(N-methylanilino)-ethyl ester used as starting material is produced as follows:

2.71 g. (0.01 mol) of 9,9-dimethyl-10-chlorocarbonyl-acridan, M.P. 145°, 1.51 g. (0.01 mol) of 2-(N-methylanilino)-ethanol, B.P. 142–144°, and 1.3 g. (0.01 mol) of diisopropyl-ethylamine in 40 ml. of anhydrous xylene are refluxed for 14 hours. After cooling, 20 ml. of water are added and the mixture is extracted with 200 ml. of ether. The ethereal phase is washed neutral with water, dried over sodium sulphate and concentrated. The residue (2.7 g.) is chromatographed on 40 g. of aluminum oxide (grade II according to Brockmann). The fractions eluted with hexane/benzene 1:1 contain the 9,9-dimethyl-acridan-10-caroboxylic acid-2-(N-methylanilino-ethyl ester. It is a viscous oil which cannot be crystallised.

Example 7

1.03 g. (0.003 mol) of 10-(3-anilinopropyl)-9,9-dimethyl-acridan, 2.13 g. (0.015 mol) of methyl iodide and 30 ml. of methanol are refluxed for 15 hours. The brown reaction solution is concentrated to dryness under water jet vacuum. 30 ml. of 2 N ammonium hydroxide are added to the residue which is then extracted with 200 ml. of ether. The ethereal phase is washed neutral with water, dried over sodium sulphate and concentrated.

To remove non-alkylated starting material, the residue obtained (0.8 g.) is dissolved in 5 ml. of chloroform, 2 ml. of acetyl chloride are added and the whole is boiled for 5 minutes on a water bath. After cooling, it is poured onto ice, taken up in 200 ml. of a mixture of ether/petroleum ether 1:1 and the solution is washed with 2 N sodium carbonate solution and with water. After drying and distilling off the solvent, an oily residue remains which is taken up in 15 ml. of ether and a solution of 0.8 g. of oxalic acid. 2 $H_2O$ in 0.5 ml. of acetone is added. Whilst the acetylated but not alkylated starting material remains in solution, the 9,9-dimethyl-10-[3-(N-methylanilino)-propyl]-acridan oxalate crystallises out; M.P. 153–154° with decomposition.

Example 8

9,9-dimethyl-10-(N-methylanilino - ethyl)-acridan.— 8.4 g. (0.0245 mol) of 2-isopropenyl-N-(N-methylanilinoethyl)-diphenylamine are dissolved in 40 ml. of borontrifluoride etherate and 2 ml. of water are added while stirring whereupon the reaction temperature rises to 50°. The whole is stirred for 1 hour and then 30 ml. of water are added dropwise. Stirring is continued for another 30 minutes and then 50 ml. of concentrated sodium hydroxide solution are added. After cooling, the reaction mixture is extracted with ether, the ethereal phase is washed neutral with water, dried over sodium sulphate and concentrated. In this way, 8.0 g. of crystalline crude product are obtained. Recrystallisation from hexane yields 6.5 g. of 9,9-dimethyl-10-(N-methylanilino-ethyl)-acridan which melts at 87–88°.

The 2-isopropenyl - N - (N-methylanilino-ethyl)-diphenylamine used as starting material is obtained as follows from N-phenyl-anthranilic acid methyl ester:

2-isopropenyl-diphenylamine.—45.5 g. (0.20 mol) of N-phenyl-anthranilic acid methyl ester dissolved in 100 ml. of anhydrous benzene are added dropwise to a methyl magnesium iodide solution produced from 19.5 g. (0.80 mol) of magnesium and 116.4 g. (0.82 mol) of methyl iodide in 250 ml. of anhydrous ether. The addition is made within 15 minutes at a reaction temperature of 30°. The whole is then stirred for 6 hours at a bath temperature of 50° whereupon it is poured onto ice. The organic phase is separated and washed twice with aqueous sodium chloride solution, dried and concentrated. 43.1 g. of a dark red oil are obtained. The oil is distilled under high vacuum. The fraction which passes over at 153–167°/0.02 torr (25.1 g.) is further purified by chromatography on 750 g. of aluminium oxide (grade II according to Brockmann). The fractions eluted with hexane yield 20.6 g. of pure 2-isopropenyl-diphenylamine as a colourless oil.

2-isopropenyl - N - (N-methylanilino-ethyl)-diphenylamine.—10.46 g. (0.05 mol) of 2-isopropenyl-diphenylamine are dissolved in 50 ml. of anhydrous toluene and 7.2 ml. (0.06 mol) of a 8.33 molar sodium amide suspension in toluene are added under an atmosphere of nitrogen. The whole is then boiled for 1 hour while stirring after which 11.03 g. (10.067 mol) of N-chlorethyl-N-methyl-aniline dissolved in 70 ml. of anhydrous toluene are added dropwise. The whole is then refluxed for 15 hours. After cooling, 50 ml. of water are added while stirring and the crude reaction mixture is extracted with ether. The ethereal solution is washed neutral with water, dried and concentrated, whereupon 20.8 g. of crude product in the form of a brown, clear oil are obtained. This oil is chromatographed on 600 g. of aluminium oxide (grade II according to Brockmann). The fractions eluted with hexane and with hexane/10% benzene yield 15 g. of pure 2 - isopropenyl-N-(N-methylanilino-ethyl)-diphenylamine as a colourless oil.

We claim:
1. A compound of the formula:

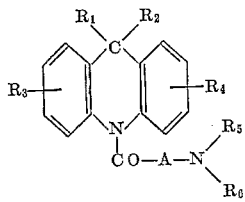

wherein:
each of $R_1$ and $R_2$, taken separately is hydrogen, methyl or ethyl, or taken together, pentamethylene;
each of $R_3$ and $R_4$ is hydrogen or lower alkyl;
$R_5$ is benzyl, phenyl or diphenylalkyl, the benzene nucleus of each being unsubstituted or substituted by halogen, trifluoromethyl, lower alkyl, nitro, amino, monoalkylamino, dialkylamino, alkanoylamino, lower alkoxy or phenoxy; or
pyridyl or chloropyridyl;
$R_6$ is hydrogen or lower alkyl; and
A is methylene, ethylene or ethylidene.

2. The pharmaceutically acceptable acid addition salts of a compound according to claim 1.

3. A compound according to claim 1 wherein said compound is of the formula:

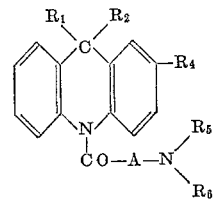

wherein:
$R_1$ is hydrogen or methyl;
$R_2$ is hydrogen, methyl or ethyl;
$R_4$ is hydrogen or methyl;
$R_5$ is phenyl, chlorophenyl, dichlorophenyl, benzyl, chlorobenzyl, dichlorobenzyl or bis(chlorophenyl)ethyl; and
$R_6$ is hydrogen or methyl.

4. The pharmaceutically acceptable acid addition salts of a compound according to claim 3.

5. A compound according to claim 1 wherein each of $R_1$ and $R_2$ is methyl, each of $R_3$, $R_4$ and $R_6$ is hydrogen, A is methylene and $R_5$ is 3,4-dichlorobenzyl.

6. A compound according to claim 1 wherein each of $R_1$, $R_2$, $R_3$, $R_4$ and $R_6$ is hydrogen, A is methylene and $R_5$ is 4-chlorobenzyl.

7. A compound according to claim 1 wherein each of $R_1$, $R_2$, $R_3$, $R_4$ and $R_6$ is hydrogen, A is methylene and $R_5$ is 3,4-dichlorophenyl.

8. A compound according to claim 1 wherein each of $R_1$, $R_2$, $R_3$, $R_4$ and $R_6$ is hydrogen, A is methylene and $R_5$ is 2,4-dichlorophenyl.

9. A compound according to claim 1 wherein each of $R_1$, $R_2$, $R_3$, $R_4$ and $R_6$ is hydrogen, A is methylene and $R_5$ is 4-chlorophenyl.

10. A compound according to claim 1 wherein each of $R_1$ and $R_2$ is methyl, each of $R_3$, $R_4$ and $R_6$ is hydrogen, A is methylene and $R_5$ is 2,2-di(4-chlorophenyl)ethyl.

11. A compound according to claim 1 wherein each of $R_1$ and $R_2$ is methyl, each of $R_3$, $R_4$ and $R_6$ is hydrogen, A is methylene and $R_5$ is 4-(dimethylamino)phenyl.

12. A compound according to claim 1 wherein each of $R_1$ and $R_2$ is methyl, each of $R_3$, $R_4$ and $R_6$ is hydrogen, A is ethylene and $R_5$ is 4-chlorophenyl.

13. A compound according to claim 1 wherein each of $R_1$ and $R_2$ is methyl, each of $R_3$, $R_4$ and $R_6$ is hydrogen, A is methylene and $R_5$ is benzyl.

14. A compound according to claim 1 wherein each of $R_1$ and $R_2$ is methyl, each of $R_3$, $R_4$ and $R_6$ is hydrogen, A is methylene and $R_5$ is 2,4-dichlorobenzyl.

References Cited

UNITED STATES PATENTS

| | | | |
|---|---|---|---|
| 3,043,842 | 7/1962 | Craig | 260—279 X |
| 3,131,190 | 4/1964 | Zirkle | 260—279 |
| 3,282,943 | 11/1966 | Landgraf et al. | 260—279 |
| 3,284,454 | 11/1966 | Haring et al. | 260—279 |

OTHER REFERENCES

Konshia et al.: Abstracted in Chem. Abst., vol. 63, col. 16348–9 (1965).

ALEX MAZEL, *Primary Examiner.*

D. G. DAUS, *Assistant Examiner.*

U.S. Cl. X.R.

260—296, 570.5, 570.9, 668; 424—232, 257

PO-1050
(5/69)

UNITED STATES PATENT OFFICE
CERTIFICATE OF CORRECTION

Patent No. 3,452,021            Dated June 24, 1969

Inventor(s) Alex Meisels and Angelo Storni

It is certified that error appears in the above-identified patent and that said Letters Patent are hereby corrected as shown below:

Col. 3, line 54, "isoproplyidene" should be -- isopropylidene --

Col. 4, line 52, "$R_5$" should be -- $R_4$ --

Col. 9, line 12, "10[-2,4-" should be -- 10-[N-2,4- --

Col. 10, line 44, "virue" should be -- virus --

Col. 12, line 69, "$R_7$" should be -- $R_6$ --

Col. 14, line 74, "of" (first occurrence) should be -- or --

Col. 15, line 45, "weight" should be -- weigh --

Col. 18, line 43, "carobxylic" should be -- carboxylic --

SIGNED AND
SEALED
MAR 24 1970

(SEAL)
Attest:

Edward M. Fletcher, Jr.
Attesting Officer

WILLIAM E. SCHUYLER, JR.
Commissioner of Patents